Patented Aug. 22, 1939

2,170,601

UNITED STATES PATENT OFFICE 2,170,601

PROCESS OF PRODUCING MATERIAL FOR PURIFYING LIQUIDS

Stansbury M. Wilson and William H. Waggaman, Baltimore, Md., assignors to Baugh & Sons Company, Philadelphia, Pa., a corporation of Pennsylvania No Drawing. Application January 8, 1937,
Serial No. 119,683

6 Claims. (Cl. 210—205)

The present invention relates to clarifying material, and particularly to material suitable for clarifying, decolorizing and purifying liquids, and the process of producing such material, preferably in the form of hard, durable granules.

One of the objects of the invention is to provide a material having the general filtering, absorbing and purifying properties of bone black but to an enhanced degree, and having approximately the chemical composition of bone black. A further object of the invention is to produce a material of this kind utilizing "spent bone black", or the fines resulting from the production of "virgin black", or other phosphatic material. Still further objects are to provide such material in the form of granules which are porous yet sufficiently hard and durable to withstand the handling incident to shipment and use, as well as the repeated heating and washing by which such material is cleaned and revivified for use in some industries. Still further objects of the invention will be apparent from consideration of the following specification.

In a general way the invention comprises mixing and forming granulated bodies of a finely divided phosphatic material and a binding agent which will hold the particles together but which chars upon heating, and a decomposable salt, such as ammonium phosphate, which upon heating will decompose into gases which render the product porous and an acid, such as phosphoric acid, which will act upon the phosphatic particles to bind them together and activate them and to harden the granules, thus compensating for the decrease of the binding effect of the binding agent as it is charred.

More specifically, the invention comprises the mixing with finely comminuted spent bone black, or the fines rejected in preparing "virgin black" which is used in considerable quantity in the oil and sugar industries, or precipitated calcium phosphates, or ground phosphate rock, or any other similar finely divided particles of phosphatic material, an organic binding material and a suitable salt, such as ammonium phosphate, and heating the mixture to char the binding agent and decompose the salt. Carbon may be added, in the form of coal or sawdust, or similar material, to obtain the desired content of carbon in the final product. The binding material should be one which chars upon heating and is preferably an organic compound such as starch, glue, sugar, molasses or the like. The salt should be one which yields gas upon decomposition, in order that the granules of the product may be suitably porous in character, and preferably a phosphate is used to obtain the revivifying and hardening effect of nascent phosphoric acid upon the phosphatic particles as the salt is decomposed. Mono- or di-ammonium phosphate have been found to be suitable for the purpose, and it also has been found that the addition of a small amount of a fluorine compound renders the granules materially harder and more resistant to shock.

In carrying out the invention, the finely divided phosphatic material is mixed with the starch, glue, molasses or other binding agent. Should the phosphatic base be devoid of carbonaceous matter, or have less than the amount of carbon desired, this is added in the form of organic material of animal, vegetable or mineral origin, preferably in the form of sawdust, or bituminous coal, or both. It is preferable that these materials be mixed thoroughly, and to the mixture there is added a solution of an ammonium salt, preferably mono- or di-ammonium phosphate, the solvent being in such an amount that the mixture will form a heavy paste.

The pasty mixture is then dried, it being desirable to extrude, or press, or otherwise form the pasty mass into relatively thin strips or ribbons, to facilitate the drying operation and to obtain a maximum percentage of the mass in the form of granules of the desired size. The hard, dry product is then crushed and screened to the desired size, the fines being again wetted and incorporated in another mix.

The hard, dry, screened granules are then introduced into a retort of any suitable type in which they are gradually heated to a temperature sufficiently high to char the organic matter and decompose the ammonium phosphate and form ammonia and phosphoric acid, such temperature being usually about 500° C. As the starch, or other organic binding material, is carbonized it gradually loses its binding effect in holding the particles of the granule together but, before the granules soften or disintegrate, the phosphoric acid, or other acid, resulting from the decomposition of the salt, reacts with some of the tricalcium phosphate of the particles to bind them together, and this binding effect is enhanced as the temperature is increased. Moreover, the carbonization of the starch, or other binding agent, and other organic matter produces gases which, together with the evolution of gaseous ammonia, renders the granules porous or cellular in structure, and the carbon contained therein will be found to be thoroughly distributed throughout the granule in a highly activated form.

While not essential, it has been found desirable in order to increase the hardness of the product, to add a small quantity of some fluorine compound which is acted upon by the phosphoric acid freed in the retorting of the product. This fluorine reacts with the other materials to render the final product appreciably harder and more resistant to shock, and it is believed that this is because of the formation of artificial fluorapatite, $Ca_{10}F_2(PO_4)_6$.

When the organic matter has been completely carbonized, the temperature is raised to from 500° C. to 800° C. and the product thus formed is composed of black granular particles of sufficient hardness and porosity to act as a highly efficient filtering medium for removing coloring matter, suspended particles and dissolved impurities from oils and other liquids which it is desired to purify.

The following formulae have been found to yield satisfactory products, and illustrate how various types of phosphatic materials may be used:

*Bone black dust*

|  | Parts |  |
|---|---|---|
| Bone black (80 mesh) | 100 | Dry mix |
| Starch | 10 |  |
| Sodium fluosilicate | 3 |  |
| Ammonium phosphate | 10 | Solution |
| Water | 80 |  |

*Precipitated tricalcium phosphate*

|  | Parts |  |
|---|---|---|
| Precipitated tricalcium phosphate | 100 | Dry mix |
| Bituminous coal (100 mesh) | 3 |  |
| Sawdust (30 mesh) | 7 |  |
| Starch | 15 |  |
| Sodium fluosilicate | 3 |  |
| Ammonium phosphate | 12 | Solution |
| Water | 85 |  |

*Phosphate rock*

|  | Parts |  |
|---|---|---|
| Phosphate rock (100 mesh) | 100 | Dry mix |
| Bituminous coal (100 mesh) | 3 |  |
| Sawdust (30 mesh) | 7 |  |
| Starch | 17.5 |  |
| Ammonium phosphate | 17.5 | Solution |
| Water | 40 |  |

While it can not be stated with certainty what the chemical reactions are, it is believed that the reactions generally are as follows:

When the mixture of materials, as above described, is first heated and the temperature gradually rises, the organic binder matter chars to form carbon, and the ammonium phosphate decomposes to form ammonia and phosphoric acid, according to the equation:

$$NH_4H_2PO_4 + heat = NH_3 + H_3PO_4$$

Inasmuch as the bone black, phosphate rock, or similar materials, contain calcium carbonate, usually in an amount from 6% to 10%, the nascent phosphoric acid derived from the ammonium phosphate immediately reacts with such calcium carbonate to form carbonic acid and tricalcium phosphate, according to the equation:

$$3CaCO_3 + 2H_3PO_4 = 3H_2CO_3 + Ca_3(PO_4)_2$$

The ultimate product of these reactions is tricalcium phosphate which acts as a binder to hold the particles together and prevent any breaking up of the granules, and the binding properties of the tri-calcium phosphate are enhanced as the temperature is gradually increased.

The action of the fluorine compounds, such as for instance sodium fluosilicate, is as follows:

The sodium fluosilicate is decomposed by the heat to form sodium fluoride and silicon-tetra-fluoride, according to the equation:

$$Na_2SiF_6 + heat = 2NaF + SiF_4$$

The nascent phosphoric acid derived from the decomposition of the ammonium phosphate then attacks the sodium fluoride to form sodium phosphate and hydrofluoric acid, in accordance with the equation:

$$NaF + H_3PO_4 = NaH_2PO_4 + HF$$

The hydrofluoric acid then attacks part of the calcium carbonate present in the bone black, phosphate rock or similar material, to form carbonic acid and calcium fluoride, in accordance with the equation:

$$CaCO_3 + 2HF = H_2CO_3 + CaF_2$$

As the temperature continues to rise the calcium fluoride combines with the tri-calcium phosphate to form what is believed to be artificial fluorapatite, according to the equation:

$$3Ca_3(PO_4)_2 + CaF_2 = Ca_{10}F_2(PO_4)_6$$

The formation of the fluorapatite increases the hardness of the granules that constitute the final product.

It will be understood that the invention is not limited to the process herein described for effecting the formation of the materials into granules, as various other methods may be used.

We do not wish to limit this invention to the use of absolutely definite proportions of the several ingredients since the nature of the phosphatic material employed will necessitate varying the quantities of the other reagents employed. Also the physical properties and chemical composition of the product may be altered, depending upon the purpose for which the product is to be used.

It is evident, therefore, that the product is susceptible of very close control yet can be altered to meet the requirements of the consumer without departing from the spirit of the invention.

The term "filtering material" is used herein to include material for clarifying, decoloring or purifying liquids or gases, whether mixed with the fluid or used in a filter bed through which the fluid is passed, that is, to define a material for any of the uses for which bone black and similar materials are utilized.

What is claimed is:

1. A process of producing filtering material, comprising adding to finely divided phosphatic material containing as an essential ingredient a substantial amount of calcium, a carbohydrate binding material and ammonium phosphate, and gradually heating the mass to a temperature sufficiently high to char the carbohydrate binding material and decompose the ammonium phosphate.

2. A process of forming a granular filtering material, comprising mixing finely divided particles of phosphatic material containing as an essential ingredient a substantial amount of calcium, a carbohydrate binding material, and a solution of ammonium phosphate, converting the mass into granular form, and gradually heating the granules to a temperature between 500° and 850° C.

3. A process of producing filtering material, comprising mixing fine particles of phosphatic material containing as an essential ingredient a substantial amount of calcium, a carbohydrate binding agent, and ammonium phosphate with sufficient water to form a paste, drying and crushing said paste to form granules, and gradually heating said granules to carbonize the organic binder and decompose said ammonium phosphate.

4. A process of producing filtering material, comprising mixing bone black, a carbohydrate binding agent, and ammonium phosphate with sufficient water to form a pasty mass, converting the mass into granules, and gradually heating the granules to a temperature sufficiently high to decompose the ammonium phosphate.

5. A process of producing filtering material, comprising mixing fine particles of phosphatic material containing as an essential ingredient a substantial amount of calcium, a carbohydrate binding agent, ammonium phosphate and a small amount of a decomposable fluorine compound, converting the mixture into granules, and heating the granules to carbonize the carbohydrate binding agent and decompose the fluorine compound and the ammonium phosphate.

6. A process of producing filtering material, comprising mixing finely divided particles of phosphatic material containing as an essential ingredient a substantial amount of calcium, a carbohydrate binding agent, an ammonium phosphate and a small amount of a decomposable fluorine compound, converting said mixture into granules, and gradually heating said granules to a temperature between 500° C. and 850° C.

STANSBURY M. WILSON.
WILLIAM H. WAGGAMAN.